US007140100B2

(12) United States Patent
Kanjee et al.

(10) Patent No.: US 7,140,100 B2
(45) Date of Patent: Nov. 28, 2006

(54) TRUSS FABRICATION SYSTEM WITH WALK-THROUGH SPLICING

(75) Inventors: Manish C. Kanjee, O'Fallon, MO (US); Thomas Bruce Hanna, Jr., Festus, MO (US)

(73) Assignee: Mitek Holdings, Inc., Wilmington, DE (US)

( * ) Notice: Subject to any disclaimer, the term of this patent is extended or adjusted under 35 U.S.C. 154(b) by 442 days.

(21) Appl. No.: 10/680,744

(22) Filed: Oct. 7, 2003

(65) Prior Publication Data

US 2005/0071977 A1 Apr. 7, 2005

(51) Int. Cl.
*B25B 27/14* (2006.01)
*B21D 47/00* (2006.01)
*B23P 21/00* (2006.01)

(52) U.S. Cl. ....................... 29/798; 29/897.31; 29/772; 29/281.3; 269/37; 269/910; 100/913

(58) Field of Classification Search ............ 29/897.31, 29/772, 784, 799, 281.3, 798; 100/913; 269/37, 269/910

See application file for complete search history.

(56) References Cited

U.S. PATENT DOCUMENTS 3,255,943 A * 6/1966 Sanford ...................... 227/152
4,084,498 A 4/1978 Weaver
4,567,821 A * 2/1986 McDonald .................. 100/100
5,170,558 A * 12/1992 Hubbard .................. 29/897.31
5,553,375 A * 9/1996 Powers ........................ 29/798
5,833,222 A 11/1998 Olden et al.
6,079,325 A 6/2000 LePoire et al.
6,260,263 B1 7/2001 Haase
RE37,797 E * 7/2002 Haase ..................... 29/897.31
6,612,230 B1 9/2003 McAdoo et al.
6,817,090 B1 * 11/2004 McAdoo et al. .............. 29/772
2004/0006868 A1 * 1/2004 Simard ........................ 29/822

FOREIGN PATENT DOCUMENTS

WO WO 01/07202 A1 2/2001

OTHER PUBLICATIONS

Online Dictionary definitions for the words "arrange", "extend", "spacer", "simultaneous", "engage", "define".*

* cited by examiner

*Primary Examiner*—David P. Bryant
*Assistant Examiner*—Sarang Afzali
(74) *Attorney, Agent, or Firm*—Senniger Powers

(57) ABSTRACT

A truss fabrication system and method for use in fabricating trusses has a truss set-up table and a gantry movable relative to the truss set-up table for pressing connector plates into truss members. A wheel guide directs movement of the roller assembly relative to the truss set-up table. The truss set-up table has a substantially horizontal table deck having a side edge, and extension arms projecting generally horizontally outward from the side edge. A gantry press moves relative to the truss set-up table and is sized and arranged relative to the truss set-up table for pressing connector plates into truss members supported on the table deck and for pressing connector plates into truss members supported on the extension arms. The extension arms are spaced apart from each other along the table deck side edge to define work bays sized to permit a worker to pass into the work bay to the table deck side edge for manipulating the truss components on the table deck.

19 Claims, 4 Drawing Sheets

TRUSS FABRICATION SYSTEM WITH WALK-THROUGH SPLICING

BACKGROUND OF THE INVENTION

This invention relates generally to a fabrication system for the assembly of trusses, and in particular to a truss fabrication system with extension arms forming an additional work surface.

Pre-manufactured structural frameworks, such as trusses, are widely used in the construction industry for forming roofs, wall panels, floors, or other building components because of their strength, reliability, low cost, and ease of use. The trusses are typically assembled in a factory using machinery facilitating rapid production of large numbers of trusses. The trusses are assembled, for example, on large truss set-up tables and then shipped to construction sites. Each truss includes a collection of typically wooden truss members held together by connector plates. For example, the truss members may include lower chord members, upper chord members, and web members extending between upper and lower chord members. During assembly of the truss, truss members are arranged on a truss set-up table, and connector plates having nail like projections or teeth extending from one side are placed at the intersections of the truss members with their teeth pointed toward the surface of the truss members. To facilitate efficient assembly of the truss, a gantry press is used to press the connector plates into the truss members. The gantry press includes a gantry mounting a cylindric roller and several wheels which ride on wheel guides located along opposite sides of the table. The roller travels along the table to press the connector plates into the truss members thereby joining them together.

During the assembly of trusses, two or more boards are often spliced together end-to-end to form a chord of a greater length. Connector plates are placed at the junctions of the boards and the roller travels over a set-up table to press the connector plates into the boards. The spliced chord members and the web members are then arranged in a different portion of the set-up table or a different set-up table, and connector plates are placed at the intersections of the truss members and the roller travels over the table to press the connector plates into the truss members.

During use of a truss set-up table, an operator manually places the truss members and connector plates on the truss set-up table's work-surface. This often requires the operator to reach across portions of the set-up table. Depending on the size of the set-up table, the operator may have to reach considerable distances to place the connector plates on the truss members, thus reducing worker productivity and increasing the risk of inaccurate placement of the connector plates. It would be desirable to provide a truss fabrication system with improved access to the truss set-up table. It would also be desirable to provide a gantry press that simultaneously assembles trusses in stages as the truss proceeds laterally across the work-surface of a single truss set-up table.

SUMMARY OF THE INVENTION

Among the several objects and features of the present invention may be noted the provision of a truss fabrication system that provides unimpeded access to the work-surface of the truss tables in a truss assembly line; and the provision of such a system which can simultaneously process multiple trusses at different stages of assembly.

In general, the invention is a truss fabrication system for use in fabricating trusses from truss components including truss members and connectors joining the truss members together. The truss fabrication system includes a truss set-up table with a substantially horizontal table deck having a side edge, and extension arms projecting generally horizontally outward from the side edge, the extension arms being spaced apart from each other along the table deck side edge. The extension arms and table deck side edge define at least one work bay sized to permit a worker to pass into the work bay to the table deck side edge for manipulating the truss components on the table deck. The truss fabrication system also includes a gantry press movable relative to the truss set-up table, the gantry press being sized and arranged relative to the truss set-up table for pressing connectors into truss members supported on the table deck and for pressing connectors into truss members supported on the extension arms.

In another aspect, the invention is a truss fabrication system for use in fabricating trusses from truss components including truss members and connectors joining the truss members together. The truss fabrication system includes a truss set-up table with a substantially horizontal table deck having a side edge, extension arms projecting generally horizontally outward from the side edge, the extension arms being spaced apart from each other along the table deck side edge. The extension arms and table deck side edge define at least one work bay sized to permit a worker to pass into the work bay to the table deck side edge for manipulating the truss components on the table deck. The truss set-up table also includes a clamping system for holding truss members in place prior to their interconnection by the connectors and a flipper arm to turn the trusses over on the table deck. The extension arms define a first work zone including the work bay for splicing truss members together. The table deck defines a second work zone for receiving spliced truss members and connectors for forming a truss subassembly, and a third work zone positioned to receive the truss subassembly from the second work zone when turned over by the flipper arm. The truss fabrication system also includes a gantry press having a cylindric roller, a gantry mounting the roller and guide wheels. The gantry press is movable relative to the truss set-up table and the roller is sized to simultaneously roll over and press connectors into truss members on the table deck and to press connectors into truss members on the extension arms. The gantry press also includes a spacer connected to the gantry and is arranged for extending under the extension arms to position one of the guide wheels generally under the table deck.

In yet another aspect, the invention is a method of assembling trusses from truss components including truss members and connectors. The method includes manually arranging truss members including spliced truss members on a table deck of a truss set-up table in the desired shape of a truss from a location adjacent the table deck and between extension arms projecting laterally outward from the table deck and manually positioning connectors from the location between extension arms adjacent the table deck so that the connectors overlie the spliced truss members. Truss members are arranged on the extension arms such that at least one of the truss members extends between the extension arms through the location from which the spliced truss members and connectors were previously positioned on the table deck, and connectors are positioned on upward facing surfaces at intersections of the truss members generally overlying the extension arms. The connectors are pressed into the truss members with a gantry press to form on the table deck a first truss subassembly with connectors pressed on a first side of the first truss subassembly and to form spliced truss members on the extension arms. In one embodiment, the method further includes flipping the first truss subassembly on the table deck to a laterally adjacent zone of the table deck so that the first side with pressed in connectors is facing the table deck. Connectors are manually positioned so that the connectors overlie the spliced truss members of the first truss subassembly. The spliced truss members are moved from the extension arms to the table deck and the spliced truss members are manually arranged with other truss member on the table deck in the desired shape of a truss from a location adjacent the table deck and between extension arms projecting laterally outwardly from the table deck. Connectors are manually positioned from a location between extension arms adjacent the table deck so that the connectors overlie spliced truss members in a second truss subassembly. Truss members are arranged on the extension arms such that at least one of the truss members extends between the extension arms through the location from which the spliced truss members and connectors were previously positioned on the table deck, and connectors are positioned on upward facing surfaces at intersections of the truss members generally overlying the extension arms. The connectors are pressed into the truss members with the gantry press to form a truss from the first truss subassembly with connectors pressed on both of the first and second sides of the truss, a second truss subassembly with connectors pressed on a first side of the second truss subassembly, and spliced truss members.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE INVENTION

Figure 1:
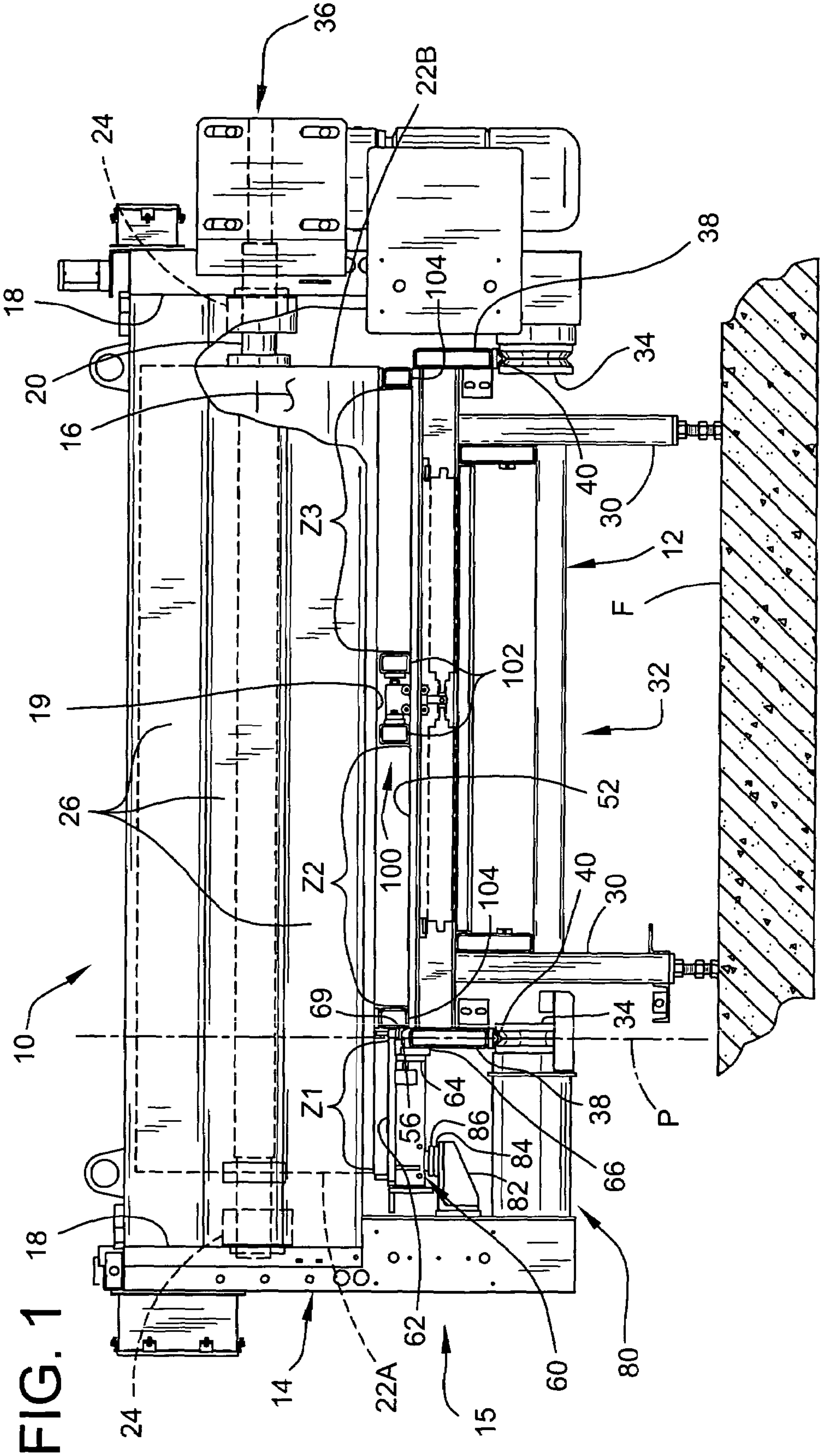
FIG. 1 is an end elevation of a truss fabrication system of the present invention partially broken away to show internal construction.
Figure 2:
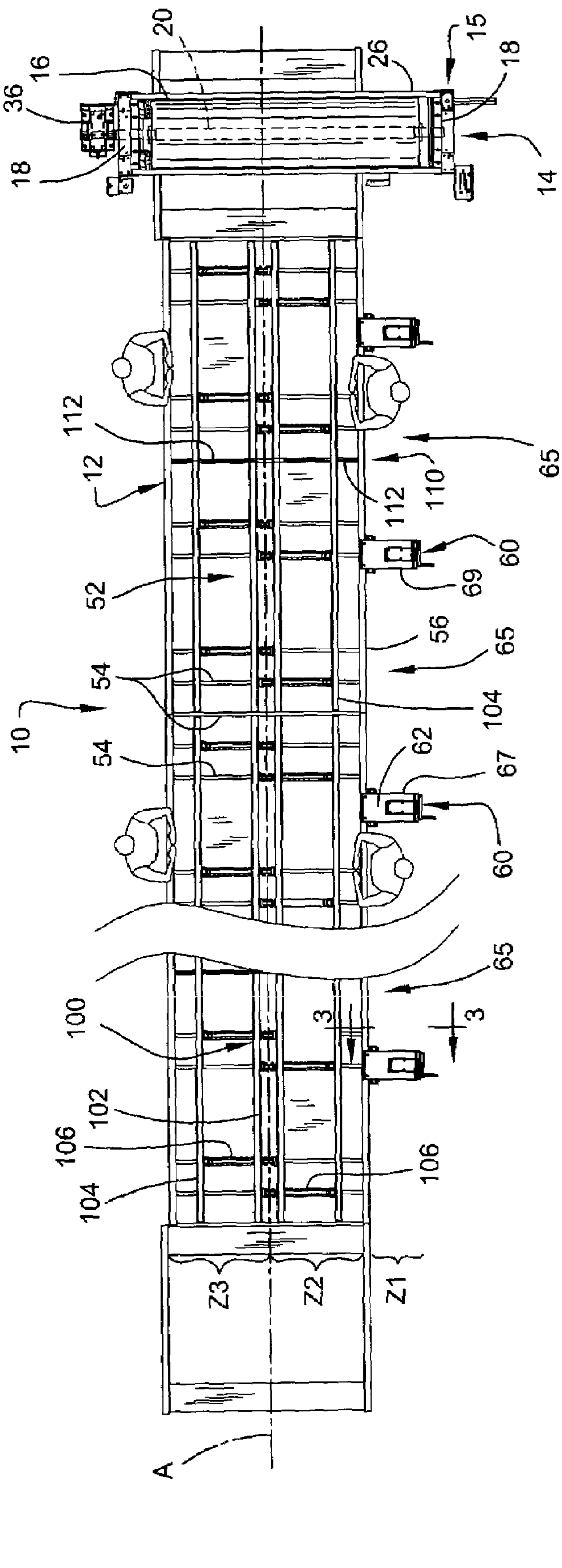
FIG. 2 is a plan view thereof.

Referring now to the drawings and in particular to FIGS. 1 and 2, a truss fabrication system according to the present invention is indicated generally at 10. The system 10 includes a truss set-up table, generally indicated at 12, on which truss members and connector plates may be positioned in a desired configuration for assembly to form a truss. Truss members typically include wooden boards forming upper and lower chords and a web of a truss. Boards may be spliced together to form larger chords. A gantry press, indicated generally at 14, is movable relative to the truss set-up table 12 and has a gantry, generally indicated at 15, and a roller 16 extending between and rotatably mounted on two spaced apart supports 18 of the gantry. The roller 16 has a circumferential surface 19 configured to press one or more connector plates into the truss members to interconnect the truss members. The roller 16 has a substantially cylindrical shape with a center shaft 20 extending from roller first and second ends 22A and 22B. Roller 16 is made of steel or similar material and weighted to apply necessary compressive force without significant flexing.

The roller shaft 20 is rotatably coupled to take-up bearings 24 mounted on respective supports 18. Each support is a generally vertically oriented plate and is interconnected with the opposite support by horizontal beams 26. The horizontal beams 26 extend between the two opposite supports 18 and are configured to ensure accurate, parallel alignment of the supports. There are six beams 26 in one suitable embodiment; three on a front side of the gantry 15 and three on a rearward side. Each support 18 mounts two wheels 34 (only some of which are shown) aligned in a row along the support. The roller 16 is connected in a conventional manner either directly or by one or more drive chains (not shown) to a motor system indicated generally at 36. The motor system 36, may include, for example, a bidirectional electric motor. Conventional drive chain sprockets and chain tightening adjusters (not shown) are also mounted on the support 18 for operatively connecting the motor system 36 to the roller 16. The gantry press 14 can have other configurations, such as different supports or number of wheels, without departing from the scope of this invention. Except as further described, the gantry press 14 may be of conventional construction. Reference is made to co-assigned U.S. patent application Ser. No. 10/233,034, filed Aug. 30, 2002 and entitled "Truss Assembly Apparatus," and to U.S. Pat. No. 6,079,325 issued on Jun. 27, 2000, entitled "Trackless Gantry Press System" and to U.S. Pat. No. Re 37,797 issued on Jul. 23, 2002, entitled "Truss Assembly Apparatus with Independent Roller Drive" which are hereby incorporated by reference for further detail of a gantry press. Those of ordinary skill in the art will readily appreciate the construction and operation of gantry presses. Accordingly, additional details of construction and operation of the gantry press 14 will not be described herein.

The table 12 has legs 30 mounted on a frame 32 which supports the frame above a floor F. Two wheel guides 38 are securely mounted on the frame 32 on opposite sides of the truss set-up table 12. The guides 38 are provided for directing movement of the gantry press 14 relative to the truss set-up table 12 along a longitudinal axis A of the set-up table. Each guide 38 comprises a suitably shaped elongate box beam extending generally along the table 12 and which provides a track for engagement by wheels 34 of the gantry press 14. A lower side of the guide 38 has a generally v-shaped projection 40 received in a corresponding groove in the wheels 34. In another embodiment (not shown), guides 38 are substantially C-shaped beams having respective top and bottom webs. It is understood that there could be other types and locations of guides (including on the floor), or only one guide, without departing from the scope of this invention.

When the motor system 36 is activated, the roller 16 moves the gantry 15 by riding on the table 12 until the roller rolls onto the surfaces of the truss members and connector plates, raising the gantry. At that point, the weight of the gantry press 14 and roller 16 bears upon the truss members and connector plates. The wheels 34 augment a pressing force imparted by the roller 16 to the connector plates (i.e., beyond the weight of the gantry press 14), by strongly opposing substantial upward movement of the roller when rolling over truss members. The connector plates are pressed into the truss members as the roller 16 passes over them.

The truss set-up table 12 has a plurality of parallel, elongate panels 50 defining a table deck, indicated generally at 52, for placement of truss members. Slots 54 are left between adjacent pairs of panels 50 suitable for placement of conventional positioning stops (not shown) capable of being fixed anywhere along the slot to collectively form a jig for locating and holding truss members on the table deck. The table deck 52 forms a substantially horizontal work surface for placement of truss members. The elongate panels 50 are mounted on the frame 32 and define a longitudinal side edge 56 of the table deck 52.

The truss set-up table 12 includes extension arms, indicated generally at 60, extending laterally from the table. The extension arms 60 extend generally horizontally from the side edge 56 of the table deck 52 and are spaced apart from each other along the longitudinal axis A of the table deck. In one embodiment, each extension arm 60 has a top plate 62 that extends out from the side edge 56 of the table deck 52. An upper surface of the top plate 62 forms a substantially horizontal work surface for placement of truss members.

Figure 3:
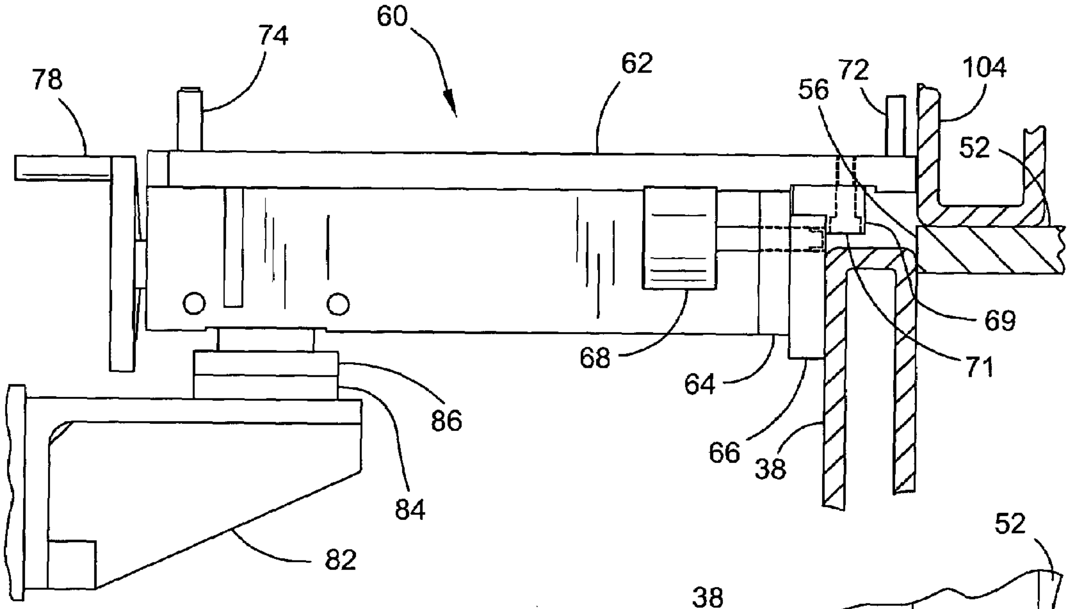
FIG. 3 is an enlarged fragmentary section taken as indicated by line 3—3 of FIG. 2 and showing side elevation of an extension arm of the truss fabrication system.
Figure 4:
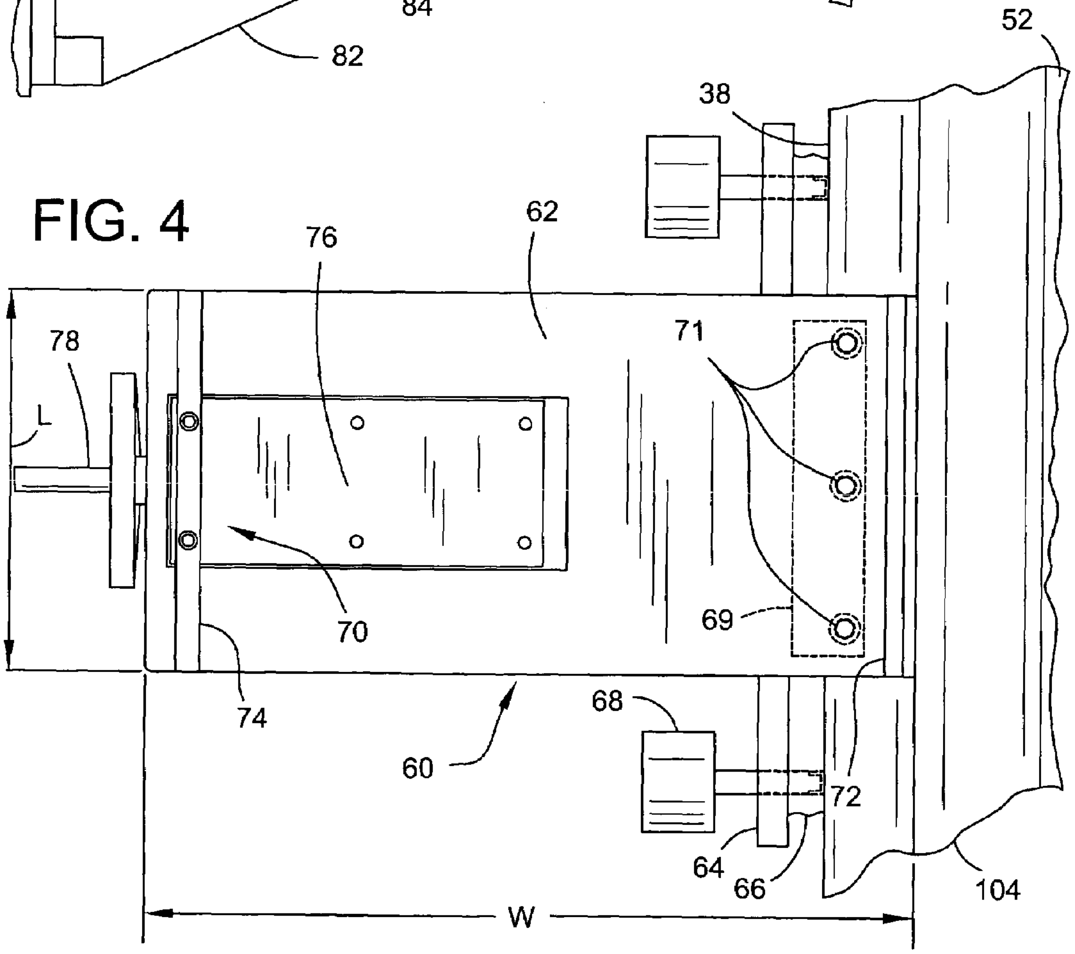
FIG. 4 is a top plan view of the fragment shown in FIG. 3.

Referring to FIGS. 3 and 4, the extension arms 60 are securely fixed to the side of the truss set-up table frame 32 so that the roller 16 can press connector plates into truss members placed on the extension arms. In one embodiment, a mounting plate 64 is fixed to the top plate 62 such as by welding. A generally L-shaped support bar 69 is attached to the bottom of the top plate 62 inward of the mounting plate 64 with fasteners 71. The support bar 69 and the mounting plate 64 form a U-shaped channel. A rail bar 66 is fixed to one of the guides 38, such as by welding. The extension arm 60 is hooked on the table 12 by inserting the rail bar 66 into the U-shaped channel. Threaded fasteners 68 extend through the mounting plate 64 and into the rail bar 66 to further secure the extension arm 60 to the truss set-up table 12. Other methods of fixing the extension arm 60 to the truss set-up table 12 may be used without departing from the scope of the invention.

The work surfaces on the upper surfaces of the extension arms 60 lie in a first work zone Z1 for splicing truss chord members together. The first work zone Z1 has a width defined by the extension arms 60 and a length corresponding to the length of the table deck 52. The work surface on the table deck 52 of the truss set-up table 12 defines substantially coplanar second work zone Z2 and third work zone Z3. Work zone Z2 and work zone Z3 lie on generally opposing sides of the centerline of the table deck 52 indicated by longitudinal axis A, and extend the length of the table deck. The work zone Z2 is for receiving truss chord members previously spliced on work zone Z1, truss web members and connector plates arranged in a pattern for forming a truss. The work zone Z3 is positioned to receive a truss subassembly from the work zone Z2 so connector plates can be pressed on a second side of the truss into the truss members to complete fabrication of the truss, as will be more fully described below. The work zones Z1, Z2 and Z3 are configured to assemble trusses in stages as the truss assembly is moved laterally through each work zone following each pass of the roller 16 such that three stages of truss assembly are performed simultaneously by the roller. The truss set-up table 12 and extension arms 60 permit the roller 16 to simultaneous press connector plates into three trusses having different levels of completion.

The extension arms 60 are spaced on the side edge 56 of the table deck 52 along the longitudinal axis A to form work bays 65 between adjacent extension arms enabling an operator to closely approach the table deck for manipulating the truss components on the table deck in work zone Z2. The extension arms 60 are spaced such that an operator standing in a work bay 65 can position truss members and connector plates in the work zone Z2 without reaching over the extension arms or the first work zone Z1. A leading edge 67 of one extension arm 60 is separated from an adjacent trailing edge 69 of the adjacent extension arm by at least about 36 inches and suitably between about 24 inches and about 20 feet.

Each extension arm 60 has a clamping system, indicated generally at 70, configured to selectively clamp the truss members in the work zone Z1 on the extension arm. In one embodiment, the clamping system 70 includes a substantially elongate inner clamping plate 72 and a substantially elongate outer clamping plate 74. The outer clamping plate 74 is mounted on a take-up plate 76 slidably received in the top plate 62. A handle 78 is mechanically linked to the take-up plate 76 to effect movement of the take-up plate and to move the outer clamping plate 74 toward or away from the inner clamping plate 72 to clamp the truss members. Rotation of the handle 78 in one direction causes the outer clamping plate 74 to move away from the inner clamping plate 72. Rotation of the handle 78 in the opposite direction causes the outer clamping plate 74 to move in the opposite direction. In one example, a lead screw (not shown) couples the handle 78 to the take-up plate 76 to effect movement of the take-up plate, but other methods of clamping the truss members on the extension arm 60 may be used without departing from the scope of the invention.

As shown in FIG. 1, the gantry 15 also includes a spacer, indicated generally at 80, connected one of the supports 18 of the gantry 15 and being arranged for extending under the extension arms 60. The spacer 80 is mounted on the support 18 and positions the wheels 34 on one side of the gantry press 14 in registration with the wheel guide 38. The spacer 80 permits the roller 16 to be arranged for pressing connector plates into truss members supported on the extension arms 60 and allows the guide 38 to be located near the side edge 56 of the set-up table 12. The work zone Z1 is substantially on one side of a vertical plane P passing through the guide 38 and the work zones Z2 and Z3 are on an opposite side of the plane.

The gantry 15 also includes an angle support 82 connected to the support 18 above the spacer 80 (see FIGS. 1 and 4). The support 82 is fixed to the gantry 15 such as with suitable fasteners (not shown) or by welding. The support 82 has a linear bearing surface 84 configured to engage a skid plate 86 fixed to the underside of each extension arm 60. The linear bearing surface 84 is suitably formed from low friction material, such as plastic, including for example an ultra-high molecular weight (UHMW) polyethylene. As the gantry 15 moves along the longitudinal axis A of the table 12 and encounters an extension arm 60, the linear bearing surface 84 engages the skid plate 86 on the extension arm and provides support for the extension arm against the downward forces on the extension arm caused by the weight of the roller 16.

In one embodiment, the extension arms 60 are sized to receive truss chord members of the truss so that two or more chord members may be spliced together to form two or more distinct chords. The connector plates are suitably placed on the upward facing surface of the chord members. In one embodiment, the top plate 62 is sized so as to receive four chord members oriented in a side-by-side arrangement with the long axes of the chord members along the longitudinal axis A of the truss set-up table 12. For example, each top plate has width W of between about 12 inches and about 20 inches, and more suitably about 16 inches and a length L of about 12 inches and about 36 inches, and more suitably about 18 inches.

In one embodiment the upper surfaces of the extension arms 60 in work zone Z1 are located at a vertical height greater than the height of the table deck 52 in the work zones Z2 and Z3. For example, in assembling a truss out of truss chord members and web members in work zone Z2, a typical 2×4 truss member is positioned on the table deck 52 on edge with the truss member height approximately three and one-half inches. As a result, the circumferential surface 19 of the roller 16 is spaced about three and a half inches above table deck 52 in the work zone Z2. In laying out the truss chord members to be spliced on the extension arms 60 in work zone Z1, a typical 2×4 truss member is positioned with one of its broad surfaces engaging the top plate 62, and the truss member height is approximately one and one-half inches. The extension arm 60 is positioned so that the upper surface of the top plate 62 is spaced from the circumferential surface 19 of the roller 16 by about one and a half inches. Thus, the connector plates can be simultaneously pressed into truss members on the extension arms 60 in work zone Z1 and truss members on the table deck 52 in work zones Z2 and Z3. These distances are for example only and are not intended to be limiting. Other distances separating the circumferential surface 19 and the work surfaces in the work zones Z1, Z2, Z3 based on the size and orientation of the truss components are contemplated without departing from the scope of the invention.

The truss set-up table 12 also includes a clamping system 100 for holding truss members in place in the work zones Z2 and Z3 on the table deck 52 prior to their interconnection by the connector plates. In one embodiment, the clamping system 100 includes in each of the work zones Z2, Z3 substantially elongate inner rails 102 and outer rails 104. The outer rail 104 is movably coupled to the truss set-up table 12. In one embodiment, the truss set-up table 12 includes pneumatic cylinders 106 sized to position respective outer rails 104 toward or away from respective inner rails 102 to hold and/or introduce a camber into the truss members. The clamping system 100 may be of conventional design such as described in co-assigned U.S. Pat. No. Re 37,797 previously incorporated by reference.

The truss set-up table 12 also includes a flipping system, indicated generally at 110, to turn the trusses over on the table deck 52. Flipping system 110 includes flipper arms 112 which can pivot between a substantially horizontal position through slots between adjacent panels 50 to a substantially vertical position relative to the table deck 52 of the truss set-up table 12 so as to transfer a truss from the work zone Z2 to the work zone Z3 and invert the truss. Movement of the flipper arms 112 may be actuated by one or more hydraulic or pneumatic cylinders (not shown). The flipping system 110 may be of conventional design such as described in co-assigned U.S. Pat. No. 6,260,263 issued on Jul. 17, 2001, entitled “Truss Set-up Table With Flipper” which is hereby incorporated by reference.

Figure 5:
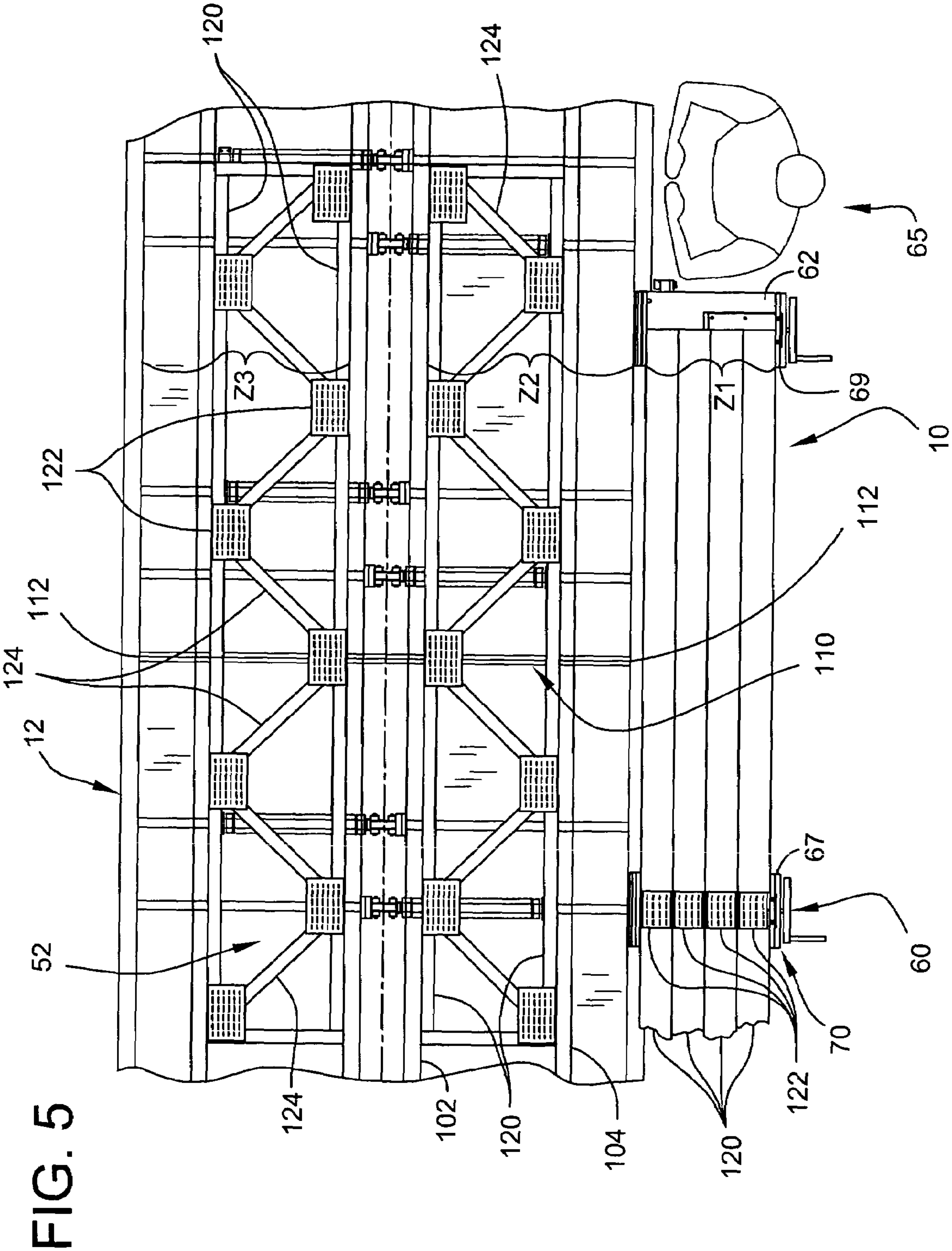
FIG. 5 is a plan view of a portion of the truss fabrication system with truss members arranged thereon.

Referring now to FIG. 5, when fabricating a truss using the above described truss fabrication system 10, a first set of truss chord members 120 are positioned on extension arms 60 in the first work zone Z1 and clamped with the clamping system 70. Connector plates 122 are positioned at the intersection of the truss chord member 120. The roller 16 (FIG. 1) moves relative to truss set-up table 12 and extension arms 60 and presses the connector plates 122 into the first set of truss chord members 120 to splice the chord members. Initially work zones Z2 and Z3 will not have any truss components or subassemblies thereon.

The first set of spliced truss chord members 120 are unclamped and moved from work zone Z1 to work zone Z2. The spliced truss chord members 120 and web members 124 are manually arranged on the work zone Z2 in the desired shape of a truss. The outer rails 104 of the clamping system 100 are moved toward the truss members 120, 124 to clamp, or trap, the members in place. Importantly, the operator arranges the truss members 120, 124 and connector plates 122 from a location in one of the work bays 65 adjacent the table deck 52 and between extension arms 60 projecting laterally outward from the table deck. Connector plates 122 are manually placed over the upwardly facing truss surfaces of the truss members 120. 124 by an operator positioned in the work bay 65 so that the connector plates overlie the intersections of the truss members.

A second set of truss chord members 120 is then arranged on the extension arms 60 in work zone Z1 such that the truss members extend between the extension arms 60 through the work bay 65 from which the truss members 120, 124 and connector plates 122 were previously positioned on the table deck 52. The truss chord members 120 are clamped in place by the clamping system 70. Connector plates 122 are positioned on upward facing surfaces at intersections of the truss chord members 120 generally overlying the extension arms 60. The rotational direction of motor system (FIG. 1) is reversed so that roller 16 moves back over the truss set-up table 12 when energized. The connector plates 122 are then pressed into the truss members 120, 124 with the roller 16 to form a first truss subassembly with connector plates pressed into a first side of the first truss subassembly on the work zone Z2 on the table deck 52, and to form spliced truss chord members 120 in work zone Z1 on the extension arms 60. The outer rail 104 is then moved away from the truss using cylinders to unclamp the truss.

The first truss subassembly is then flipped on the table deck from the work zone Z2 to the laterally adjacent work zone Z3 of the table deck 52 using the flipper arms 112 so that the first side with pressed in connector plates 122 is facing the table deck 52. Connector plates 122 are manually positioned from a location adjacent the table deck on the side opposite the extension arms 60 so that the connector plates overlie the truss members of the first truss subassembly on a second side of the truss. The second set of spliced truss chord members 120 are moved from the extension arms 60 in work zone Z1 to the second work zone Z2 of the table deck 52 and manually arranged with web members 124 on the table deck in the desired shape of a truss from the work bay 65 adjacent the table deck. Connector plates 122 are manually positioned from the work bay 65 between extension arms 60 adjacent the table deck side edge 56 so that the connector plates overlie spliced truss members 120, 124 in a second truss subassembly. A third set of truss chord members 120 are then arranged on the extension arms 60 such that the truss members extend between the extension arms 60 through the work bay 65 or location from which the spliced truss members and connector plates were previously positioned on the table deck 52. Connector plates 122 are positioned at the intersections of the truss chord members 120 generally overlying the extension arms 60. The connector plates 122 are pressed into the truss members 120, 124 with the gantry press 14 to form a completed truss from the first truss subassembly with connector plates pressed on both of the first and second sides of the truss in work zone Z3, a second truss subassembly with connector plates pressed on a first side of the second truss subassembly in work zone Z2, and spliced truss chord members in work zone Z1.

The third set of truss chord members 120, second truss subassembly and first trusses all have the connector plates 122 simultaneously positioned such that the roller 16 presses the connector plates into the third set of chord members, second truss subassembly and first truss simultaneously. After unclamping, the first completed truss is removed from the truss set-up table 12 and the second truss subassembly is flipped to the work zone Z3 and the process is continued. This method of operation increases production rates and decreases the production costs.

Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

When introducing elements of the present invention or the preferred embodiment(s) thereof, the articles “a”, “an”, “the” and “said” are intended to mean that there are one or more of the elements. The terms “comprising”, “including” and “having” are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A truss fabrication system for use in fabricating trusses from truss components including truss members and connectors joining the truss members together, the truss fabrication system comprising:

a truss set-up table including a substantially horizontal table deck having a side edge, and extension arms projecting generally horizontally outward from the side edge, the extension arms being spaced apart from each other along the table deck side edge, the extension arms and table deck side edge defining at least one work bay sized to permit a worker to pass into the work bay to the table deck side edge for manipulating the truss components on the table deck; and a gantry press movable relative to the truss set-up table, the gantry press being sized and arranged relative to the truss set-up table for pressing connectors into truss members supported on the table deck and for pressing connectors into truss members supported on the extension arms.

2. A truss fabrication system as set forth in claim 1 wherein the extension arms define multiple work bays along the table deck side edge.

3. A truss fabrication system as set forth in claim 1 wherein the gantry press further comprises a bearing surface engagable with a surface of an extension arm to support the extension arm as the gantry press presses connectors into truss members supported on the extension arm.

4. A truss fabrication system as set forth in claim 1 wherein the extension arms are fixed to the truss set-up table in a position projecting horizontally outward from the side edge of the table deck.

5. A truss fabrication system as set forth in claim 1 wherein the extension arms have upper surfaces for engaging and supporting truss components, the upper surfaces being located at a vertical height greater than the height of the table deck.

6. A truss fabrication system as set forth in claim 5 wherein the upper surfaces of the extension arms are located between about 1 and 3 inches above the table deck.

7. A truss fabrication system as set forth in claim 1 wherein the gantry press is sized and arranged relative to the truss set-up table for simultaneously pressing connectors into truss members supported on the table deck and the connectors into truss members supported on the extension arms.

8. A truss fabrication system as set forth in claim 7 further comprising guides for guiding the movement of the gantry press relative to the truss set-up table, the guides being located out of registration with the work bay.

9. A truss fabrication system as set forth in claim 8 wherein the guides are mounted on the truss set-up table.

10. A truss fabrication system as set forth in claim 9 wherein one of the guides is located adjacent to the table deck side edge.

11. A truss fabrication system as set forth in claim 8 wherein the guides are located generally on opposite sides of the table deck, the gantry press comprising a gantry, a cylindric roller rotatably mounted on the gantry sized for engaging connectors to press the connectors into truss members supported on the table deck and supported on the extension arms, a motor for powering rotation of the roller, and guide wheels engaging the guides for guiding motion of the gantry press.

12. A truss fabrication system as set forth in claim 11 wherein one side of the gantry includes a spacer connected to one of the guide wheels and arranged to extend under the extension arms to position said one guide wheel for engagement with one of the guides.

13. A truss fabrication system as set forth in claim 1 wherein the extension arms define a first work zone and the table deck defines a second work zone, each work zone being configured to hold connectors and truss members in position for the gantry press to simultaneously press connectors into truss members.

14. A truss fabrication system as set forth in claim 13 wherein the extension arms have upper surfaces for engaging and supporting truss components in the first work zone, the upper surfaces being located at a vertical height greater than the height of the table deck in the second work zone.

15. A truss fabrication system as set forth in claim 13 wherein the first work zone includes the work bay, the extension arms being adapted to hold truss members spanning adjacent extension arms through the work bay.

16. A truss fabrication system as set forth in claim 13 wherein the table deck further comprises a third work zone configured to hold connectors and truss members in position for the gantry press to press connectors into truss members in the third work zone simultaneously with pressing connectors into truss members in the first and second work zones.

17. A truss fabrication system as set forth in claim 16 wherein the work zones are configured to assemble trusses in stages as the truss proceeds laterally through each work zone, wherein the first work zone is configured to splice certain of the truss members together, the second work zone is configured to press connectors on a first side of the truss into truss members to connect the truss members together, and the third work zone is configured to press connectors on a second side of the truss into the truss members.

18. A truss fabrication system as set forth in claim 17 wherein the truss set-up table comprises a flipper arm positioned for flipping the truss over from the second work zone to the third work zone.

19. A truss fabrication system as set forth in claim 18 wherein said truss set-up table further comprises a clamping system configured to selectively clamp the truss members in the second and third work zones on the table deck.

* * * * *